United States Patent
Baba et al.

(10) Patent No.: US 7,817,862 B2
(45) Date of Patent: Oct. 19, 2010

(54) METHOD AND APPARATUS FOR RETRIEVING PATTERN, AND COMPUTER PRODUCT

(75) Inventors: Takayuki Baba, Kawasaki (JP); Susumu Endo, Kawasaki (JP); Shuichi Shiitani, Kawasaki (JP); Yusuke Uehara, Kawasaki (JP); Daiki Masumoto, Kawasaki (JP); Shigemi Nagata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1101 days.

(21) Appl. No.: 11/355,993

(22) Filed: Feb. 15, 2006

(65) Prior Publication Data

US 2007/0122063 A1  May 31, 2007

(30) Foreign Application Priority Data

Nov. 30, 2005 (JP) .............................. 2005-346004

(51) Int. Cl.
*G06K 9/68* (2006.01)
*G06K 9/62* (2006.01)
*G06K 9/46* (2006.01)
*G06F 17/30* (2006.01)

(52) U.S. Cl. ..................... 382/218; 382/225; 382/190; 707/706

(58) Field of Classification Search ................. 382/218, 382/227, 190, 225; 707/706
See application file for complete search history.

(56) References Cited

U.S. PATENT DOCUMENTS 6,539,115 B2 * 3/2003 Fujimoto et al. ............ 382/225

7,092,555 B2 * 8/2006 Lee et al. .................... 382/118

OTHER PUBLICATIONS

Gottumukkal et al, An improved face recognition technique based on modular PCA approach, 2004, Pattern Recogntion Letters, pp. 429-436.*
Baba et al.; "A shape-based part retrieval method for mechanical assembly drawings"; Technical Report of IEICE PRMU2004-225; pp. 79-84; 2005.
Liu et al.; "Attributed Graph Matching based Engineering Drawings Retrieval"; Proc. of IAPR Workshop on Document Analysis Systems (DAS04); pp. 378-388; Sep. 2004.
Liu et al.; "Component Parts Extraction from Assembly Drawings for Content Based Retrieval"; Proc. of the IEEE Int'l. Conf. on Visual Information Engineering: Convergence in Graphics and Vision (VIE2005); pp. 45-50; Apr. 2005.
Endo et al.; "Miracles: Multimedia information retrieval system integrating visual search with textual search"; DBWeb2001, IPSJ Symposium Series Vo. 2001, No. 17, pp. 249-256; 2001.

* cited by examiner

*Primary Examiner*—Bhavesh M Mehta
*Assistant Examiner*—Kathleen S Yuan
(74) *Attorney, Agent, or Firm*—Greer, Burns & Crain, Ltd.

(57) ABSTRACT

A pattern retrieving unit includes an acquiring unit that acquires a representative pattern image; a setting unit that sets a use condition of a type of shape feature of the representative pattern image; a receiving unit that receives a query pattern image used as a query; a determining unit that determines the type of shape feature of the representative pattern image to be the type of shape feature of the query pattern image, based on the use condition; a retrieving unit that retrieves a pattern image identical or similar to the query pattern image, using determined type of shape feature; and an output unit configured to output a result of retrieval by the retrieving unit.

8 Claims, 11 Drawing Sheets

SAMPLE-PATTERN IMAGE DB 202

| ID | SAMPLE PATTERN IMAGE | REPRESENTATIVE-PATTERN IMAGE ID |
|---|---|---|
| S1 |  | Ri |
| S2 |  | Ri |
| S3 |  | Ri |
| S4 |  | R1 |
| ⋮ | ⋮ | ⋮ |
| Sj |  | R2 |
| ⋮ | ⋮ | ⋮ |
| Sm |  | R3 |

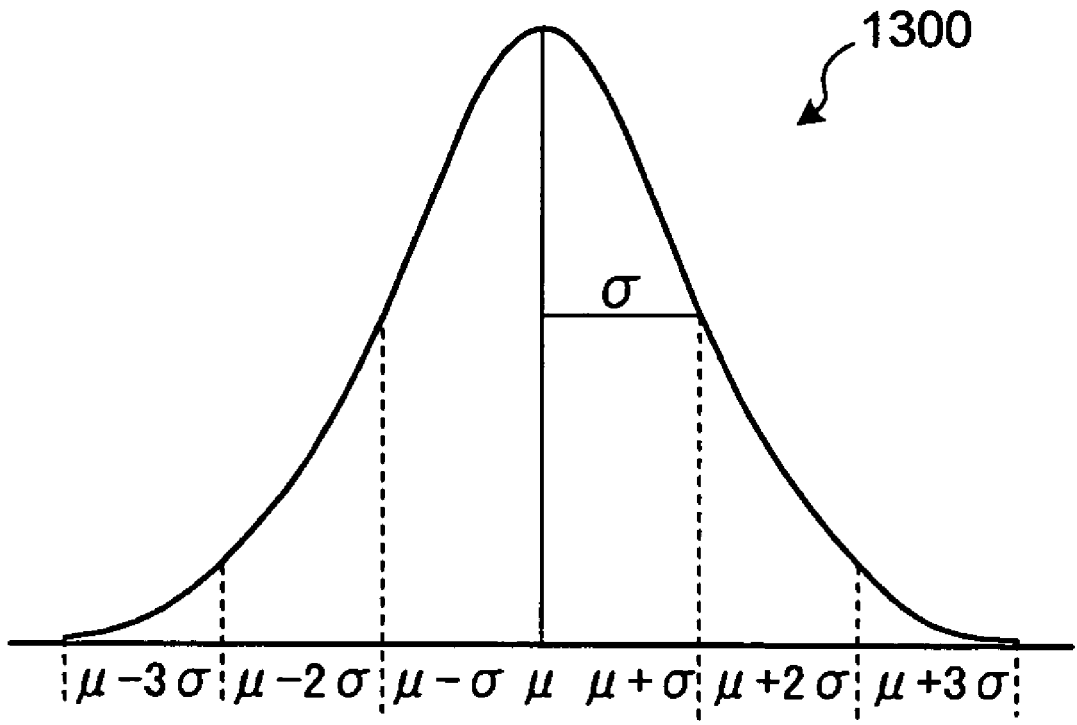

METHOD AND APPARATUS FOR RETRIEVING PATTERN, AND COMPUTER PRODUCT

CROSS-REFERENCE TO RELATED APPLICATIONS

This application is based upon and claims the benefit of priority from the prior Japanese Patent Application No. 2005-346004, filed on Nov. 30, 2005, the entire contents of which are incorporated herein by reference.

BACKGROUND OF THE INVENTION

1. Field of the Invention

The present invention relates to a technology for retrieving a pattern image.

2. Description of the Related Art

In a manufacturing field, to develop a competitive product at low costs and to introduce the product into markets as early as possible, it is desirable to effectively utilize technical resources such as drawings of existing products. To find out necessary information from among a large number of drawings that have been accumulated, a retrieving technique that can efficiently retrieve a drawing including necessary parts is necessary.

In a simple method, retrieval has been performed mainly based on texts by using a part name provided to a drawing as a key word. Recently, to retrieve a part having a shape difficult to be expressed only with texts, a similar-pattern retrieving in which the retrieval is performed using pattern information of a part depicted in a drawing is also getting popular. Such a technology is disclosed in, for example, Technology and Research Report of Electronic Information and Communication Association, PRMU2004-225, pp. 79-84 (2005), titled "Proposal of Part Retrieval Approach Based on Patterns Obtained from Machine System Assembly Drawings" by Baba, Liu Rujie, Endo, Shiitani, Uehara, Masumoto, and Nagata; Proc. of IAPR Workshop on Document Analysis Systems (DASO4), September 2004, pp. 378-388, "Attributed Graph Matching Based Engineering Drawings Retrieval" by Liu Rujie, Baba, and Masumoto; and Proc. of the IEE International Conference on Visual Information Engineering: Convergence in Graphics and Vision (VIE2005), April 2005, pp. 45-50) titled "Component Parts Extraction from Assembly Drawings for Content Based Retrieval" by Liu Rujie, Baba, and Masumoto.

In the above technique, predetermined types of features are prepared in advance for information such as a pattern extracted from drawings. However, the features to be utilized in retrieving have to be designated by a user in a trial-and-error manner.

If a designated feature is not appropriate, precision of retrieval is degraded. If a desired pattern can not be retrieved, another feature has to be designated again to repeat the retrieval. Thus, the retrieval requires much time.

In the conventional method for designating a query image in the similar-pattern retrieving, as a query image to be designated first by a user, an image called "representative query image" is prepared for each roughly classified type (genre), such as bolt or nut, of drawing.

In such similar-pattern retrieval, empirically obtained knowledge cannot be effectively utilized even when it is empirically known that higher retrieval precision can be obtained using a different type of feature depending on a representative query image. For example, even when it is understood that higher retrieval precision can be respectively obtained using feature a for a representative query image A, and using feature b for a representative query image B, there is no mechanism in the conventional similar-pattern retrieval to utilizes such information.

Therefore, when a new query image α is given, a feature to be used has to be designated by a user in a trial-and-error manner without utilizing the empirically obtained information.

SUMMARY OF THE INVENTION

It is an object of the present invention to at least solve the above problems in the conventional technology.

A computer-readable recording medium according to one aspect of the present invention stores therein a computer program for retrieving a pattern. The computer program makes a computer execute acquiring a representative pattern image; setting a use condition of a type of shape feature of the representative pattern image; receiving a query pattern image used as a query; determining the type of shape feature of the representative pattern image to be the type of shape feature of the query pattern image, based on the use condition; retrieving a pattern image identical or similar to the query pattern image, using determined type of shape feature; and outputting a result of retrieval at the retrieving.

An apparatus according to another aspect of the present invention is for retrieving a pattern. The apparatus includes an acquiring unit configured to acquire a representative pattern image; a setting unit configured to set a use condition of a type of shape feature of the representative pattern image; a receiving unit configured to receive a query pattern image used as a query; a determining unit configured to determine the type of shape feature of the representative pattern image to be the type of shape feature of the query pattern image, based on the use condition; a retrieving unit configured to retrieve a pattern image identical or similar to the query pattern image, using determined type of shape feature; and an output unit configured to output a result of retrieval by the retrieving unit.

A method according to still another aspect of the present invention is of retrieving a pattern. The method includes acquiring a representative pattern image; setting a use condition of a type of shape feature of the representative pattern image; receiving a query pattern image used as a query; determining the type of shape feature of the representative pattern image to be the type of shape feature of the query pattern image, based on the use condition; retrieving a pattern image identical or similar to the query pattern image, using determined type of shape feature; and outputting a result of retrieval at the retrieving.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 13 is a graph showing Gaussian distribution in the pattern retrieving apparatus.

DETAILED DESCRIPTION OF THE PREFERRED EMBODIMENTS

Exemplary embodiments according to the present invention will be explained in detail below with reference to the accompanying drawings.

Figure 1:
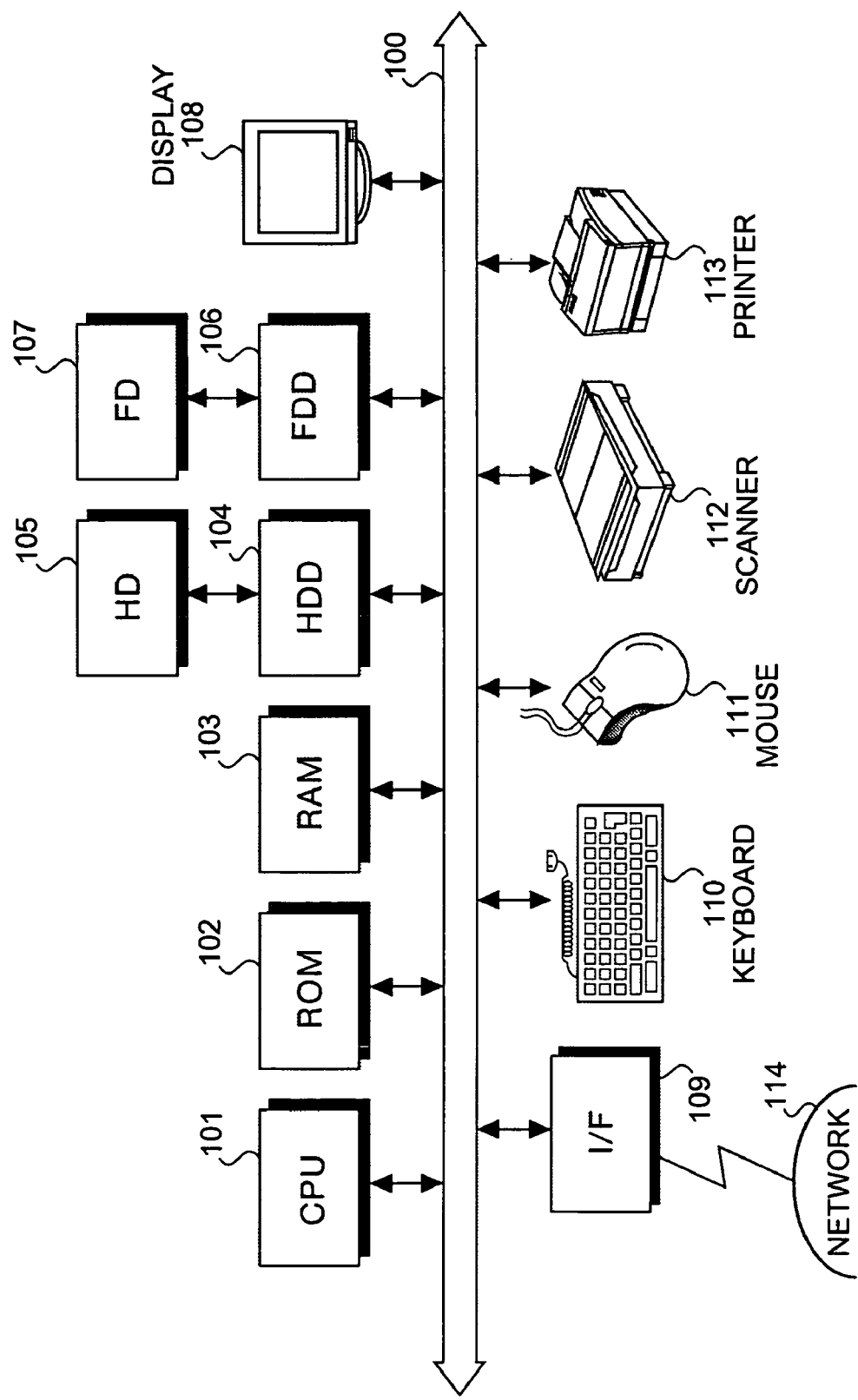
FIG. 1 is a schematic of a pattern retrieving apparatus according to an embodiment of the present invention.

FIG. 1 is a schematic of a pattern retrieving apparatus according to an embodiment of the present invention. As shown in FIG. 1, the pattern retrieving apparatus includes a central processing unit (CPU) 101, a read-only memory (ROM) 102, a random-access memory (RAM) 103, a hard disk drive (HDD) 104, a hard disk (HD) 105, a flexible disk drive (FDD) 106, a flexible disk (FD) 107 as an example of a removable recording medium, a display 108, an interface (I/F) 109, a keyboard 110, a mouse 111, a scanner 112, and a printer 113. Each component is connected with others through a bus 100.

The CPU 101 is controls the entire pattern retrieving apparatus. The ROM 102 stores programs such as a boot program. The RAM 103 is used as a work area of the CPU 101. The HDD 104 controls reading/writing of data from/to the HD 105 according to a control of the CPU 101. The HD 105 stores data written in the HD 105 according to a control of the HDD 104.

The FDD 106 controls reading/writing of data from/to the FD 107 according to a control of the CPU 101. The FD 107 stores data written in the FD 107 according to a control of the FDD 106 and allows the pattern retrieving apparatus to read the data stored in the FD 107.

Besides the FD 107, the removable recording medium may be a compact-disk read-only memory (CD-ROM), a compact-disk recordable (CD-R), a compact-disk rewritable (CD-RW), a magneto-optical (MO) disk, a digital versatile disk (DVD), and a memory card. The display 108 displays data such as texts, images, and functional information in addition to a cursor, icons, or tool boxes. A cathode ray tube (CRT), a thin film transistor (TFT) liquid crystal display (LCD), and a plasma display may be employed as the display 108.

The I/F 109 is connected through a communication line with a network 114 such as the Internet, and is connected with external apparatus through the network 114. The I/F 109 administers the interface between the network 114 and the interior, and controls input/output of data sent from an external apparatus. As the I/F 109, for example, a modem or an LAN adaptor may be employed.

The keyboard 110 includes keys for inputting letters, numerals, and various instructions, and is used for inputting data. Instead, the keyboard 110 may be a touch-panel input pad, or a numeric key. The mouse 111 can be used for moving the cursor, selecting an area, and moving or changing the size of a window. The mouse 111 may be a track ball, or a joy stick that also has the functions as a pointing device.

The scanner 112 optically reads images and captures image data into the pattern retrieving apparatus. The scanner 112 may have an optical character reader (OCR) function. The printer 113 prints out image data and text data. As the printer 113, for example, a laser printer or an ink-jet printer may be employed.

Figure 2:
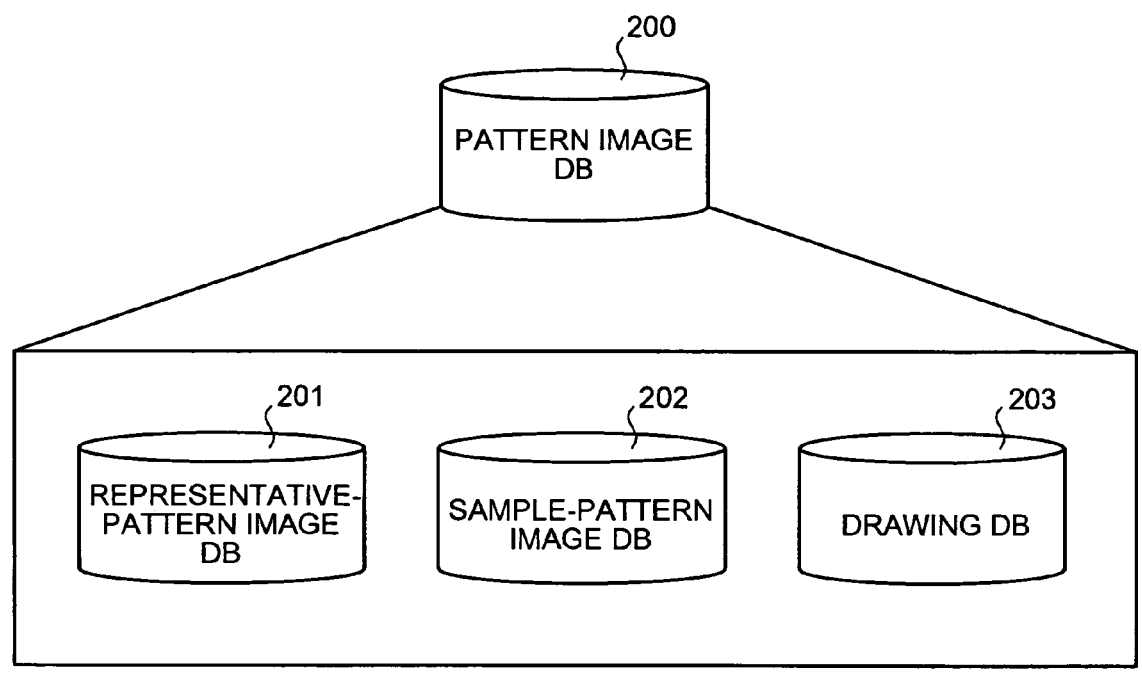
FIG. 2 is a schematic of a pattern image database (DB) in the pattern retrieving apparatus.

FIG. 2 is a schematic of a pattern image database (DB) in the pattern retrieving apparatus. A pattern image DB 200 shown in FIG. 2 includes a representative-pattern image DB 201, a sample-pattern image DB 202, and a drawing DB 203. The pattern image DB 200 realizes its function using, for example, recording medium, such as the ROM 102, the RAM 103, and the HD 105.

The representative-pattern image DB 201 stores various representative pattern images. The representative pattern images are pattern image representing basic shapes of patterns such as a bolt and a nut, and are prepared for each type (genre). The sample-pattern image DB 202 stores sample pattern images. The sample pattern images are pattern images that are deformed samples of the representative pattern images, and are prepared for each type (genre). The drawing DB 203 stores pattern data to be retrieved.

Figure 3:
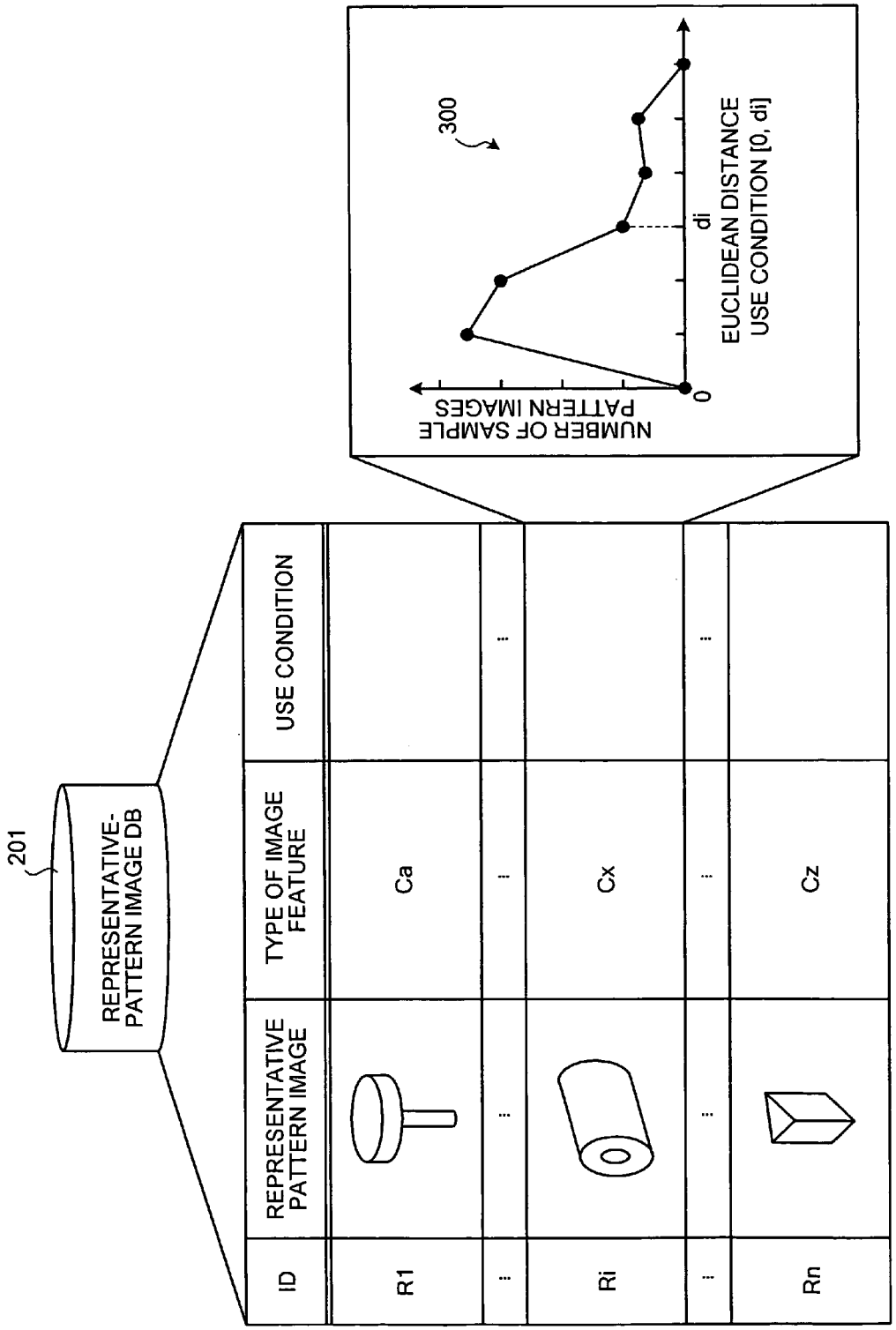
FIG. 3 is a schematic for illustrating data stored in a representative-pattern image DB shown in FIG. 2.

FIG. 3 is a schematic for illustrating data stored in the representative-pattern image DB 201. As shown in FIG. 3, each of the representative pattern images is respectively assigned with a specific identification (ID): R1 to Rn. A representative pattern image having an ID: Ri (i=1 to n) will be referred to as "representative pattern image Ri".

Each representative pattern image Ri is respectively correlated with a type Cx (x=a to z) of shape feature. The shape feature is numerical information extracted from the representative pattern image Ri itself, such as color and shape of the representative pattern image Ri. The type Cx of shape feature is information that identifies an extraction form of a shape feature.

When it is empirically understood that it is better to use a different type Cx of shape feature depending on the representative pattern image Ri, such an empirical knowledge is utilized for the retrieval. For example, when it is empirically understood that it is better to use a type Ca of shape feature for a representative pattern image R1, and to use a type Cz of shape feature for a representative pattern image Rn, the representative pattern image R1 is correlated with the type Ca of shape feature, and the representative pattern image Rn is correlated with the type Cz of shape feature. A use condition is set by a setting unit 602.

Figure 4:
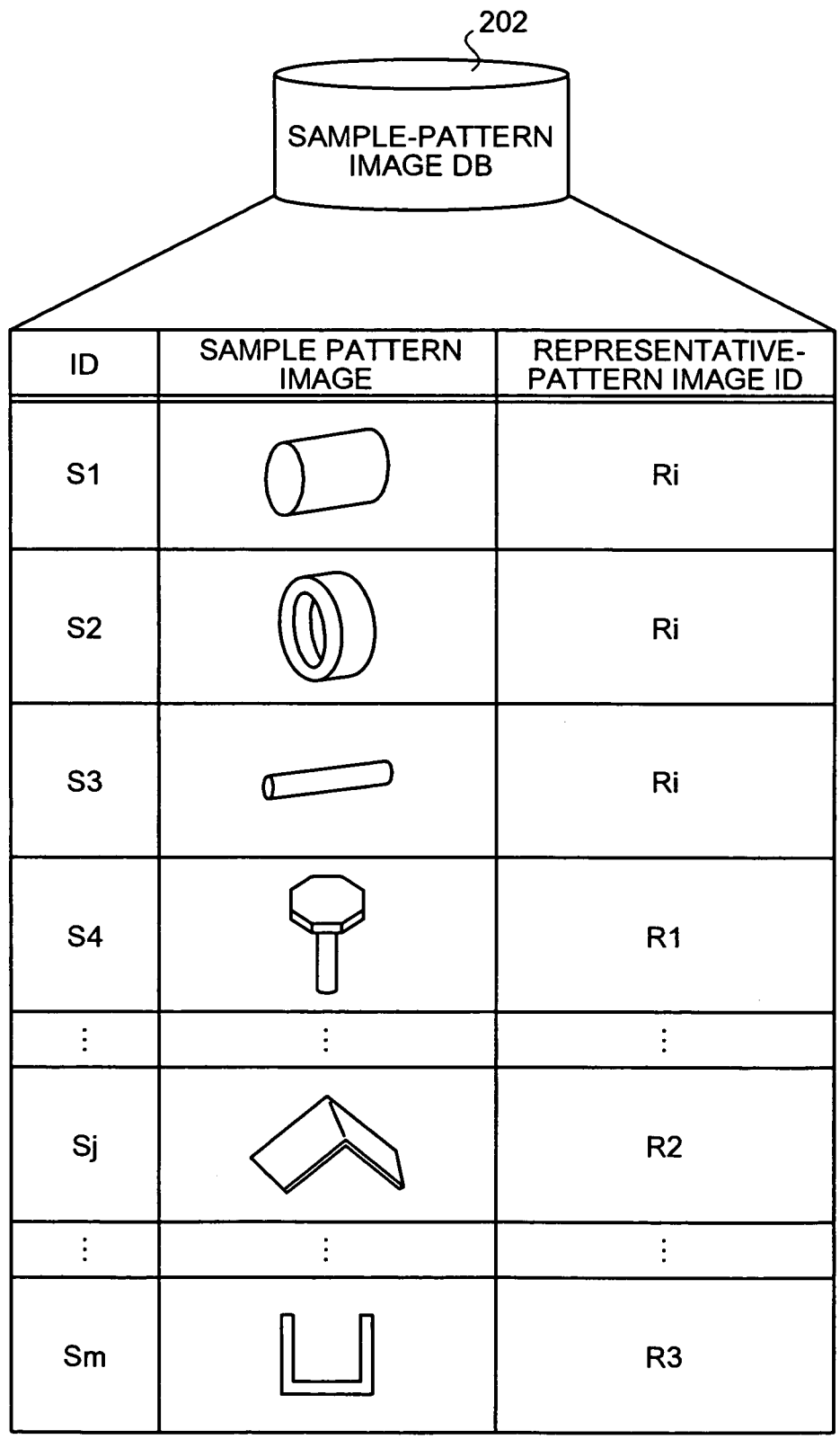
FIG. 4 is a schematic for illustrating data stored in a sample-pattern image DB shown in FIG. 2.
Figure 4:
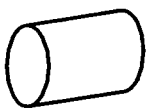
Figure 4:
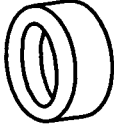
Figure 4:
Figure 4:
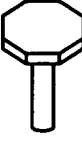
Figure 4:
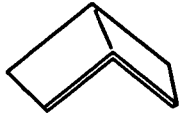

FIG. 4 is a schematic for illustrating data stored in the sample-pattern image DB 202. As shown in FIG. 4, each of the sample pattern images is respectively assigned with a specific ID: S1 to Sm. A sample pattern image having an ID: Sj (j=1 to m) will be referred to as "sample pattern image Si".

Figure 5:
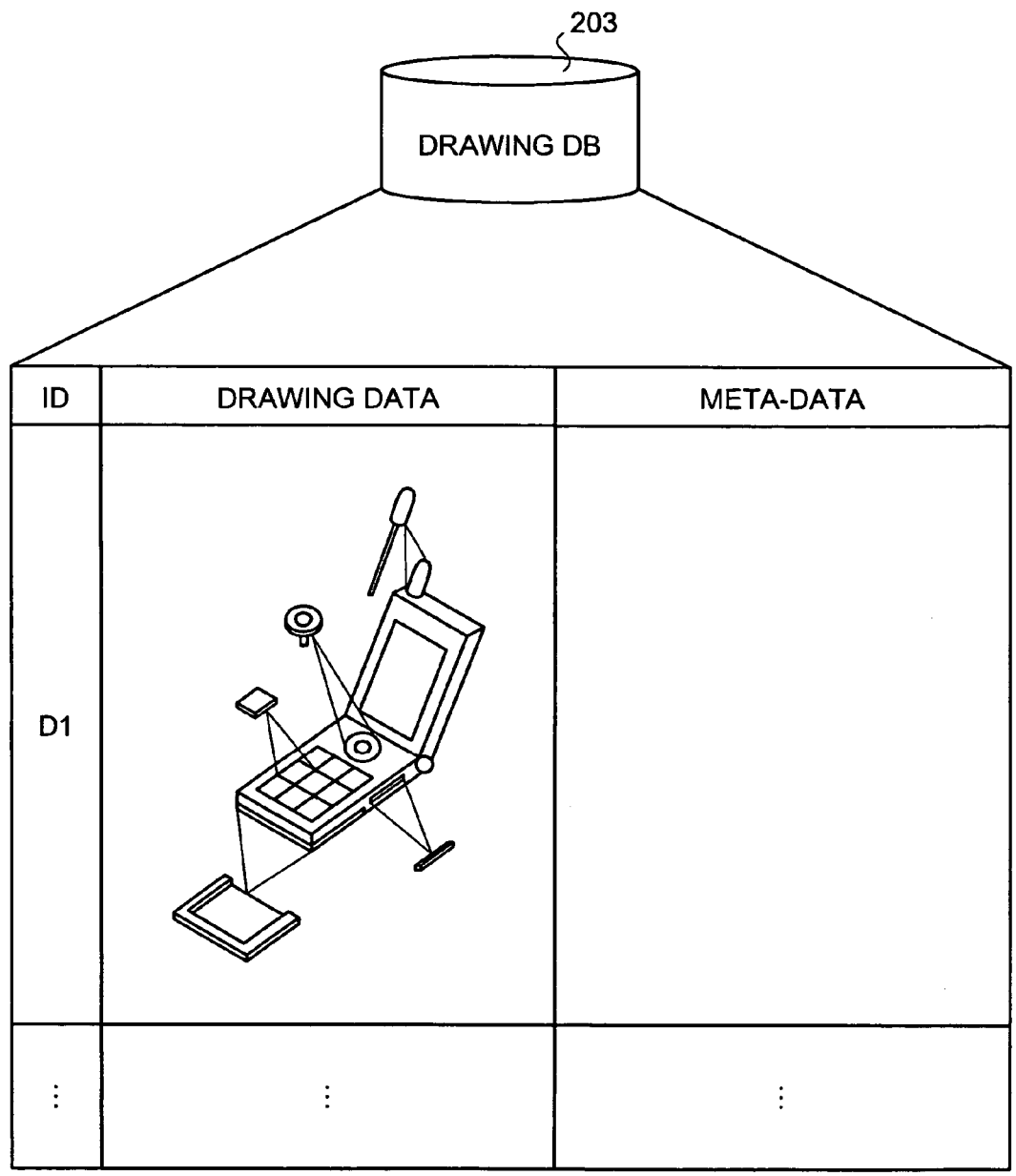
FIG. 5 is a schematic for illustrating data stored in a drawing DB shown in FIG. 2.

FIG. 5 is a schematic for illustrating data stored in the drawing DB 203. As shown in FIG. 5, each of the drawing data is respectively assigned with a specific ID: D1, D2 . . . . For example, a drawing datum having a drawing ID: D1 is a drawing datum relating to an exploded perspective view of a mobile phone. Each drawing datum is assigned with meta-data. As the meta-data, for example, text data indicating the characteristics of a pattern in the drawing datum is described.

Figure 6:
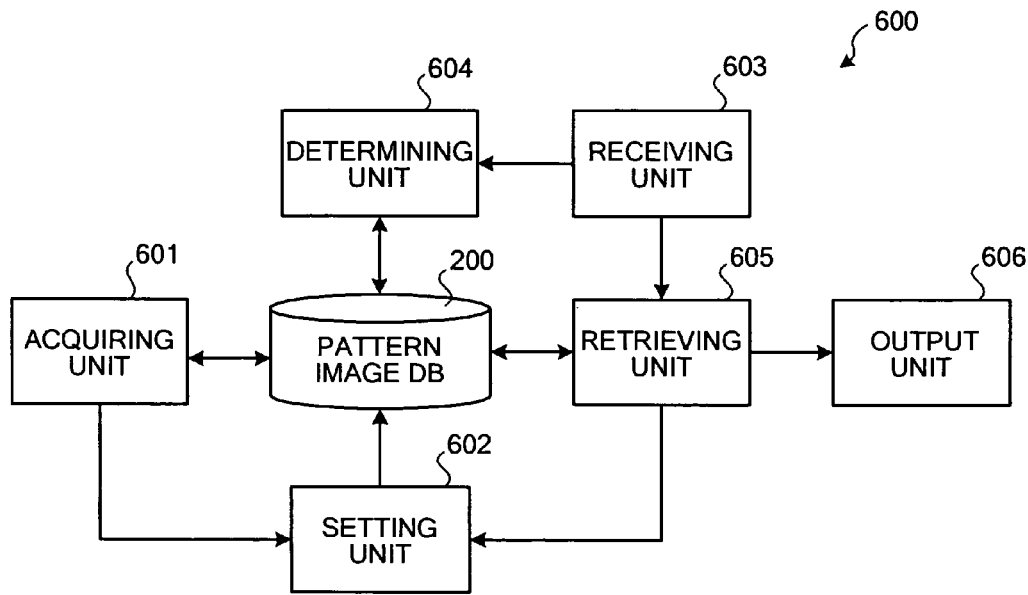
FIG. 6 is a block diagram of the pattern retrieving apparatus.

FIG. 6 is a block diagram of the pattern retrieving apparatus. As shown in FIG. 6, a pattern retrieving apparatus 600 includes the pattern image DB 200, an acquiring unit 601, the setting unit 602, a receiving unit 603, a determining unit 604, a retrieving unit 605, and an output unit 606.

The acquiring unit 601 acquires the representative pattern image Ri. More specifically, an arbitrary representative pattern image Ri is extracted from the representative-pattern image DB 201 in the pattern image DB 200. The type of the representative pattern image is also extracted together with the representative pattern image. For example, the representative pattern image Ri and the type Cx of the shape feature of the representative pattern image Ri are extracted.

The setting unit 602 sets the use condition relating to the type Cx of the shape feature of the representative pattern image Ri. The use condition is a condition for using the type Cx of the shape feature of the representative pattern image Ri for the retrieval. More specifically, the condition defines the range of the similarity of the representative pattern image Ri obtained when the type Cx of the shape feature is used.

For example, when the type Cx of the shape feature of the representative pattern image Ri has been set, a condition that defines the range of the similarity of the representative pattern image Ri is set. When the type Cx of the shape feature of the representative pattern image Ri has not been set, the type Cx of the shape feature of the representative pattern image Ri is set as well as a condition that defines the range of similarity of the query pattern image Ri obtained when the type Cx of the shape feature that has been set is set.

In either case, when the type Cx of the shape feature of the representative pattern image Ri has been set, an Euclidean distance section Ii (Ii=[0, di]) from the representative pattern image Ri for the type Cx of the shape feature is defined as the range of the similarity of the representative pattern image Ri. Because the Euclidean distance section Ii (Ii=[0, di]) defines the representative pattern image Ri as the origin O, the similarity becomes higher as the Euclidean distance section approaches zero.

The receiving unit 603 receives a query pattern image Q input by a user. The query pattern image Q is input by the user operating the keyboard 110 and the mouse 111 shown in FIG. 1. The determining unit 604 determines the type Cx of the shape feature of the representative pattern image Ri to be the type of the shape feature of the query pattern image Q input by the receiving unit 603 based on the use condition having been set by the setting unit 602.

The retrieving unit 605 retrieves a pattern image that is similar to the query pattern image Q using the type Cx of the shape feature determined by the determining unit 604. More specifically, a pattern image that is identical or similar to the query pattern image Q is retrieved from the drawing DB 203. For example, a conventional method that uses an image feature such as the color or the shape of a pattern image in the drawing data, and a method that utilizes a text feature by utilizing the meta-data attached to the drawing data can be listed.

For example, a feature such as an image feature and a text feature are extracted from the pattern images in each drawing datum and, the similarity of the feature between the query pattern image Q and the pattern image in each drawing datum is calculated. Based on the similarity, whether the pattern image is identical or similar to the query pattern image is determined. The distance between feature vectors is measured and the similarity is considered to be higher as the distance becomes smaller.

The output unit 606 outputs a result of the retrieval by the retrieving unit 605. The result of retrieval includes a list of pattern images that are identical or similar to query pattern images, identifying information for the pattern image and meta-data. The result is output to the display 108 or to the printer 113 shown in FIG. 1.

Figure 7:
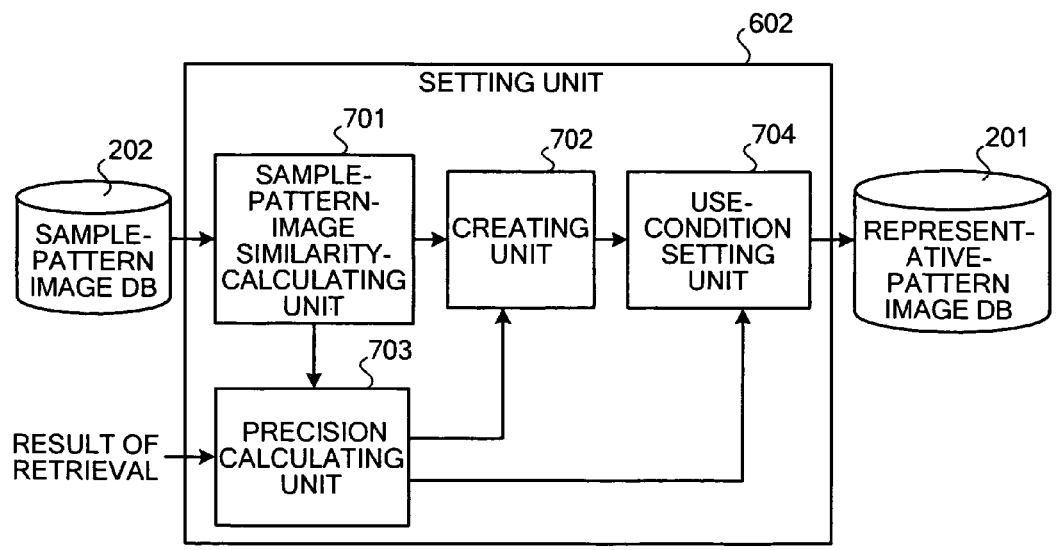
FIG. 7 is a block diagram of a setting unit shown in FIG. 6.

FIG. 7 is a block of the setting unit 602. As shown in FIG. 7, the setting unit 602 includes a sample-pattern-image similarity-calculating unit 701, a creating unit 702, a precision calculating unit 703, and a use-condition setting unit 704.

The sample-pattern-image similarity-calculating unit 701 first calculates the similarity between a representative pattern image Ri and a sample pattern image Sj using the type Cx of the image feature. More specifically, the sample pattern images Sj are sequentially extracted from the sample-pattern image DB 202. For each extracted sample pattern image Sj, a Euclidean distance from the representative pattern image Ri to the sample pattern image Sj for the type Cx of the shape feature having been set for the representative pattern image Ri is calculated.

For example, for the representative pattern image Ri, a feature vector of the representative pattern image Ri is created using the type Cx of that shape feature, as well as a feature vector of the sample pattern image Sj is created using the type Cx of that shape feature. Based on both of these created feature vectors, the Euclidean distance from the representative pattern image Ri to the sample pattern image Sj is calculated.

The creating unit 702 creates a probability density distribution 300 of the sample pattern images Sj in terms of the calculated Euclidean distance. More specifically, the probability density distribution 300 shown in FIG. 3 is created. The probability density distribution 300 is shown in a graph having an axis of abscissas representing Euclid distance and an axis of ordinate representing the number of sample pattern images. This probability density distribution 300 can be displayed on the display 108 shown in FIG. 1.

The precision calculating unit 703 calculates the retrieval precision. Retrieval precision Ax is the retrieval precision based on the sample pattern image Sj obtained when the type Cx of the shape feature is used.

The retrieval precision Ax can be expressed as Ax=q/p where, for the representative pattern image Ri, "p" is the number of the sample pattern images correlated with the representative pattern image Ri and "q" is the number of the sample pattern images of the top p images obtained when the type Cx of the shape feature is used.

The use-condition setting unit 704 sets a use condition based on the similarity calculated by the sample-pattern-image similarity-calculating unit 701. More specifically, the Euclidean distance section Ii (Ii=[0, di]) that is an arbitrary use condition is manually set by an operator while viewing the probability density distribution 300 displayed on the display 108.

When the probability density distribution 300 is created based on a predetermined probability (for example, 80%) that has been set in advance, a Euclid distance section Ii (Ii=[0, di]) corresponding to the predetermined probability can be set automatically as the use condition if more sample pattern images than those corresponding to the predetermined probability appear.

When no type of shape feature has been set for the representative pattern image Ri, the use-condition setting unit 704 sets the type Cx of shape feature that is the highest retrieval precision among the calculated retrieval precision Ax as the type of shape feature for the representative pattern image Ri when the retrieval precision Ax is calculated by the precision calculating unit 703 for each type Cx of shape feature.

The use-condition setting unit 704 changes the use condition relating to the type of shape feature determined by the determining unit 604 in response to a second retrieval precision A2. More specifically, when the second retrieval precision A2 is equal to or less than a predetermined precision, the Euclidean distance section Ii is changed to be narrowed. This change may be performed by a manual operation by an operator, or by an automatic operation to narrow by a predetermined amount. The type Cx of shape feature that has been set or changed is stored in the representative-pattern image DB 201.

Figure 8:
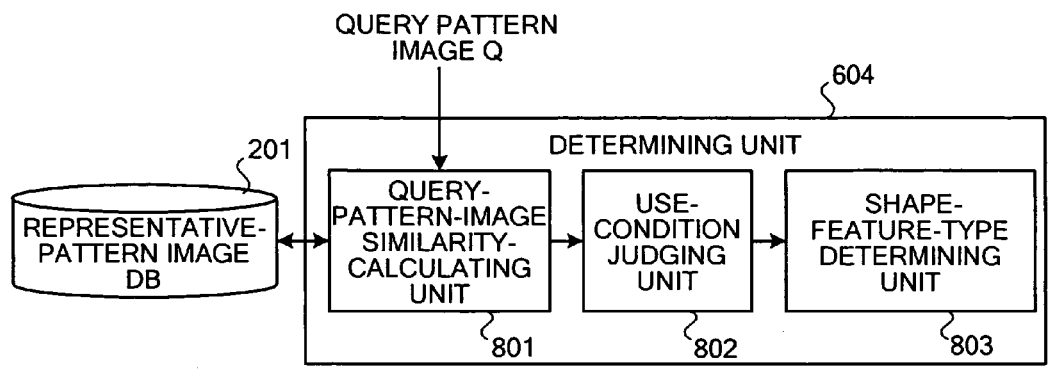
FIG. 8 is a block diagram of a determining unit shown in FIG. 6.

FIG. 8 is a block diagram of the determining unit 604. As shown in FIG. 8, the determining unit 604 includes a query-pattern-image similarity-calculating unit 801, a use-condition judging unit 802, and a shape-feature-type determining unit 803.

The query-pattern-image similarity-calculating unit 801 calculates the similarity between the representative pattern image Ri and the query pattern image Q using the type Cx of shape feature of the representative pattern image Ri. More specifically, a Euclidean distance dq between the representative pattern image Ri and the query pattern image Q is calculated.

For example, for the representative pattern image Ri, a feature vector of the representative pattern image Ri is created using the type Cx of that shape feature as well as a feature vector of the query pattern image Q is created using the type Cx of that shape feature. Based on both of these created feature vectors, the Euclidean distance dq from the representative pattern image Ri to the query pattern image Q is calculated as the similarity.

The use-condition judging unit 802 judges whether the similarity calculated by the query-pattern-image similarity-calculating unit 801 satisfies the use condition. More specifically, whether the Euclidean distance dq between the representative pattern image Ri and the query pattern image Q obtained when the type Cx of shape feature of the representative pattern image Ri is used, is within the Euclidean distance section Ii obtained when the type Cx of shape feature of the representative pattern image Ri is used is judged.

The shape-feature-type determining unit 803 determines the type Cx of shape feature of the representative pattern image Ri as the type of shape feature of the query pattern image Q based on a result of judgment by the use-condition judging unit 802. More specifically, for example, when the Euclidean distance dq between the representative pattern image Ri and the query pattern image Q obtained when the type Cx of shape feature of the representative pattern image Ri is used, is within the Euclidean distance section Ii obtained when the type Cx of shape feature of the representative pattern image Ri is used, the type Cx of shape feature of the representative pattern image Ri is determined to be the type of shape feature of the query pattern image Q.

When plural Euclidean distances dq are present within the Euclid distance section Ii, the type Cx of shape feature corresponding to a Euclidean distance that is closest to zero is determined to be the type of shape feature of the query pattern image Q.

Figure 9:
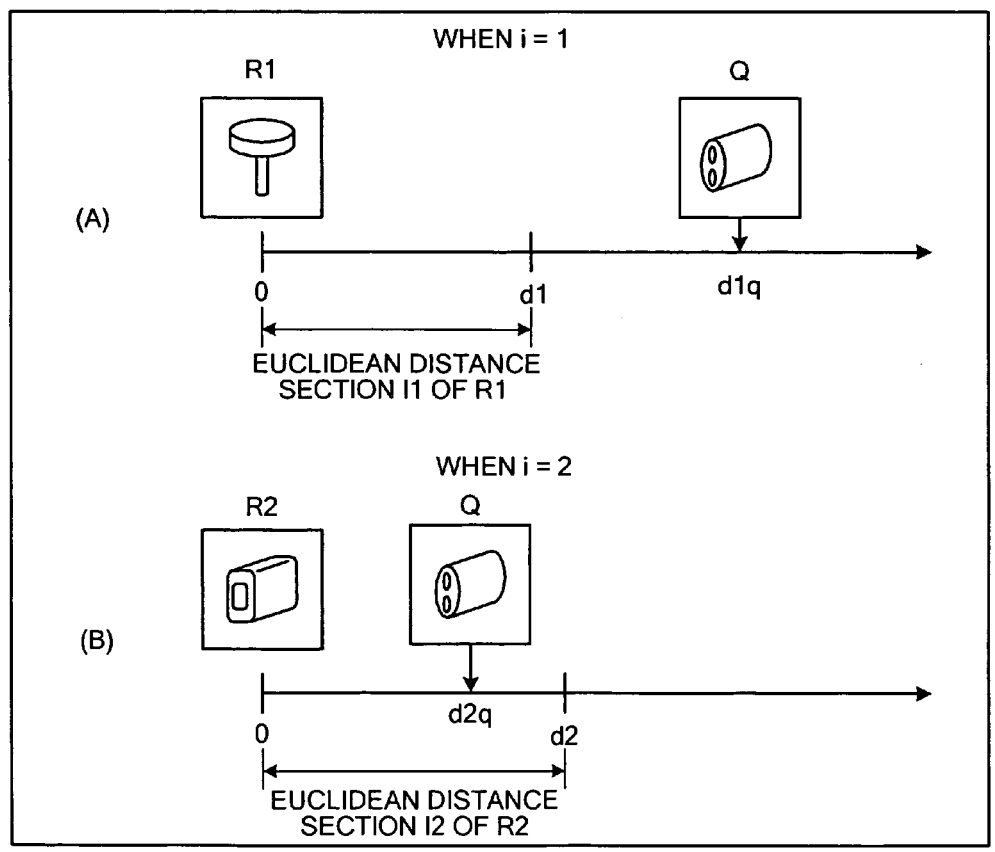
FIG. 9 is a schematic for illustrating a determining process by the determining unit.

FIG. 9 is a schematic for illustrating a determining process executed by the determining unit 604. As shown in FIG. 9, a Euclidean distance $d1q$ of the query pattern image Q obtained when the type Ca of shape feature is used as a Euclid distance section I1 (I1=[0, d1]) relating to a type Ca of shape feature of a representative pattern image R1, is larger than the Euclid distance d1 (d1<d1$q$). Therefore, it can be seen that the type Ca of shape feature is not suitable for the type of shape feature of the query pattern image Q.

A Euclidean distance $d2q$ of the query pattern image Q obtained when the type Cb of shape feature is used as a Euclid distance section I2 (I2=[0, d2]) relating to a type Cb of shape feature of a representative pattern image R2, is equal to or smaller than the Euclid distance d2 (d2≧d2$q$). Therefore, it can be seen that the type Cb of shape feature is suitable for the type of shape feature of the query pattern image Q.

More specifically, the acquiring unit 601, the setting unit 602, the receiving unit 603, the determining unit 604, the retrieving unit 605, and the output unit 606 realize the functions of these units by, for example, execution by the CPU 101 of the programs recorded on a recording media, such as the ROM 102, the RAM 103, and the HD 105 shown in FIG. 1, or by I/F 109.

Figure 10:
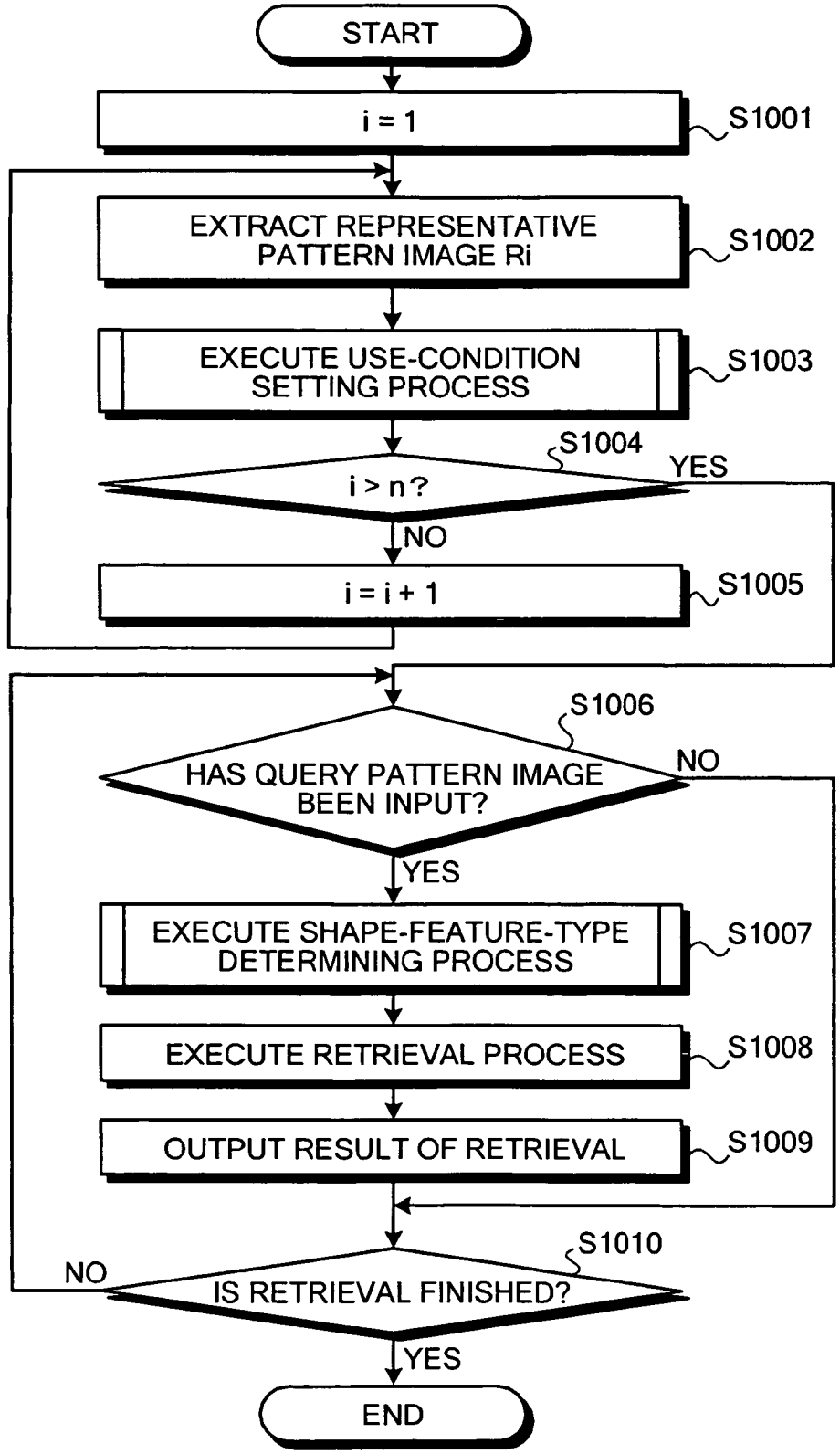
FIG. 10 is a flowchart of a pattern retrieving process by the pattern retrieving apparatus.

FIG. 10 is a flowchart of a pattern retrieving process by the pattern retrieving apparatus 600. As shown in FIG. 10, it is determined that i=1 (step S1001) and a representative pattern image Ri is extracted from the representative-pattern image DB 201 by the acquiring unit 601 (step S1002). A use-condition setting process is executed by the setting unit 602 (step S1003).

Whether i>n is thereafter judged (step S1004). When i>n is not satisfied (step S1004: NO), i is incremented (step S1005) and the process is returned to step S1002. When i>n is satisfied (step S1004: YES), whether a query pattern image Q has been input by the receiving unit 603 is judged (step S1006).

When the query pattern image has not been input (step S1006: NO), the process proceeds to step S1010. When the query pattern image has been input (step S1006: YES), a shape-feature-type determining process is executed (step S1007).

A pattern image that is identical or similar to the query pattern image is then retrieved by the retrieving unit 605 from the drawing DB 203 (step S1008). A result of the retrieval is output by the output unit 606 (step S1009).

Whether the pattern retrieval is finished is then judged (step S1010). When the pattern retrieval is continued (step S1010: NO), the process is returned to step S1006. When the pattern retrieval is finished (step S1010: YES), the series of the pattern retrieving process is ended.

Figure 11:
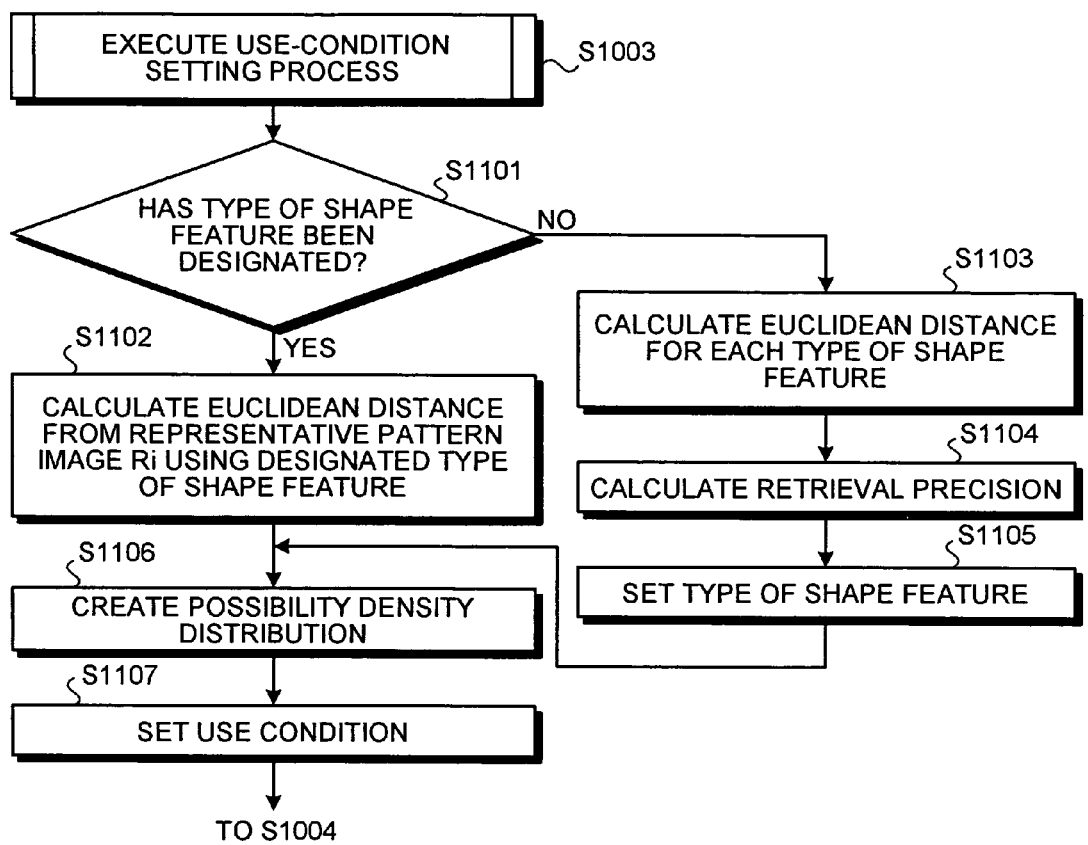
FIG. 11 is a flowchart of a use-condition setting process shown in FIG. 10.

FIG. 11 is a flowchart of the use-condition setting process (step S1003) shown in FIG. 10. As shown in FIG. 11, whether the type of shape feature has been designated is judged (step S1101). When the type of shape feature has been designated (step S1101: YES), a Euclidean distance di from the representative pattern image Ri to the sample pattern image Sj is calculated using the designated type Cx of shape feature (step S1102).

On the other hand, when the type of shape feature has not been designated (step S1101: NO), a Euclidean distance d from the representative pattern image Ri to the sample pattern image Sj is calculated using a type Cx of shape feature for each type Cx of shape feature (step S1103). Retrieval precision Ax is calculated by the precision calculating unit 703 (step S1104) and the type of shape feature is set by the shape-feature-type determining unit 803 (step S1105).

Following step S1102 or S1105, the probability density distribution 300 is created by the creating unit 702 (step S1106) and the use condition (Euclidean distance section I) is set by the use-condition setting unit 704 (step S1107). The process proceeds to step S1004 shown in FIG. 10.

Figure 12:
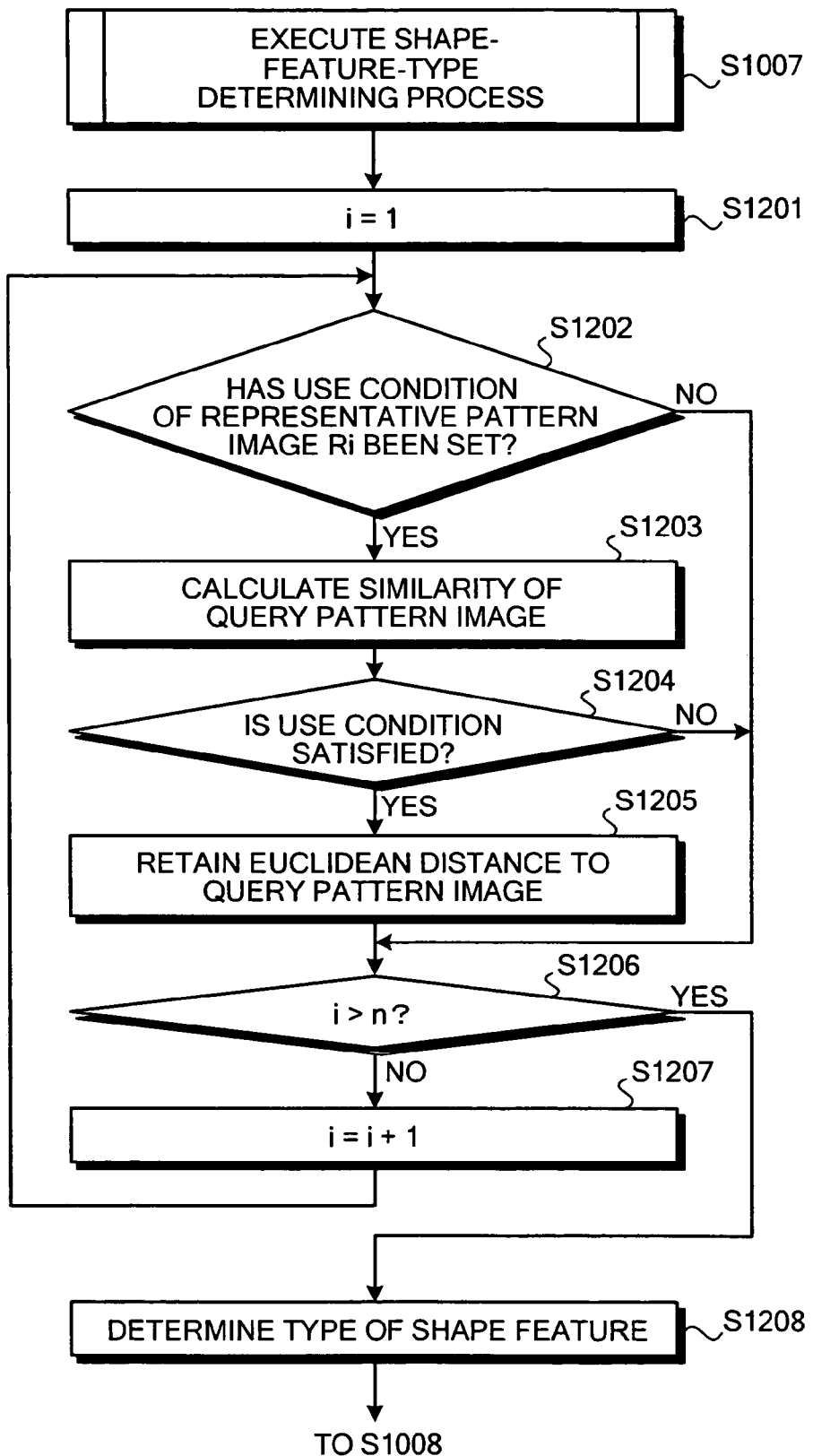
FIG. 12 is a flowchart of a shape-feature-type determining process shown in FIG. 10.

FIG. 12 is a flowchart of the shape-feature-type determining process (step S1007) shown in FIG. 10. In FIG. 12, it is determined that i=1 (step S1201), and whether a use condition of the representative pattern image Ri has been set is judged (step S1202). When the condition has not been set (step S1202: NO), the process proceeds to step S1206. When the use condition of the representative pattern image Ri has been set (step S1202: YES), the similarity (Euclid distance) of the query pattern image to the representative pattern image Ri obtained when the shape feature Cx of the representative pattern image Ri is used is calculated by the query-pattern-image similarity-calculating unit 801 (step S1203).

Whether the calculated similarity satisfies the use condition, that is, whether the calculated Euclid distance di is within the Euclid distance section Ii is judged (step S1204). When the use condition is not satisfied (step S1204: NO), the process proceeds to step S1206.

When the use condition is satisfied (step S1204: YES), the Euclidean distance diq to the query pattern image is retained (step S1205). Whether i>n is satisfied is judged at step S1206. When i>n is not satisfied (step S1206: NO), i is incremented (step S1207) and the process is returned to step S1202.

When i>n is satisfied (step S1206: YES), the type Cx of shape feature corresponding to a Euclidean distance diq that is closest to zero, in types Cx of shape feature corresponding to the Euclid distance diq that has been retained, is determined by the shape-feature-type determining unit 803 to be the type of shape feature of the query pattern image (step S1208). The process proceeds to step S1008 shown in FIG. 10.

In this manner, in the embodiment described above, for each query pattern image, the type of shape feature suitable for the query pattern image can be set automatically. Therefore, the pattern retrieval precision can be improved. Because a returned process such as that a user is not satisfied with the retrieval result and the user designates another type of shape feature and retrieves again is reduced. Therefore, time required for the pattern retrieval is reduced.

At a stage before operation (steps S1001 to S1005 shown in FIG. 10), fine adjustment by customizing according to the type of the drawing data retained by the user is possible, and, in addition, because the similarity expected by the user can be more easily reflected to the pattern retrieving apparatus 600, pattern retrieval matched with the user environment can be realized.

While in the above embodiment, the Euclidean distance section Ii and the Euclidean distance di are used in setting the use condition and calculating the similarity, Manhattan distances (sections) may be used as the distance information.

The probability density distribution 300 shown in FIG. 3 may be set using a probability density function. For example, a case that uses Gaussian distribution as the probability density function, will be described. FIG. 13 is a graph of Gaussian distribution. A Gaussian distribution 1300 can be described when the average value $\mu$ and the standard deviation $\sigma$ are determined.

A Euclid distance from a representative pattern image Ri to each sample pattern image Sj is thus calculated and the Gaussian distribution 1300 is created determining the standard deviation of the Euclidean distances to be the standard deviation $\sigma$ of Gaussian distribution and the average value of the Euclidean distances to be the average value $\mu$ of Gaussian distribution. Referring to this Gaussian distribution 1300, the operator sets an appropriate section as the use condition. Otherwise, a previously fixed value of [0, 3$\sigma$] may be used as the use condition of the representative pattern image Ri.

As described above, by automatically setting the optimal type of shape feature to be utilized when a query pattern image is retrieved, it is possible to improve the precision and efficiency of the pattern retrieving process.

The pattern retrieving method described referring to the embodiment can be realized by executing programs prepared in advance on a computer such as a personal computer, and a work station. This program is recorded in a computer-readable recording medium such, as an HD, an FD, a CD-ROM, an MO, and a DVD, and is executed by being read from the recording medium by a computer. This program may be in a form of a transmissible medium that can be distributed through a network such as the Internet.

According to the embodiments described above, it is possible to improve precision and efficiency of a pattern retrieving process.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A non-transitory computer-readable recording medium that stores therein a computer program for image retrieval, said program causing a computer to perform a process comprising:

setting a feature and a use condition for each of a plurality of representative query images;

receiving a query image;

extracting the feature and the use condition from each of the representative query images;

calculating a similarity between the query image and each of the representative query images;

determining which one of features that are extracted from the representative query images at the extracting is to be used in the image retrieval based on whether the similarity satisfies the use condition extracted at the extracting;

retrieving at least one image from among a plurality of images by calculating a similarity between the query image and each of the images with respect to the feature that is determined to be used at the determining; and outputting the image retrieved at the retrieving, wherein each of the representative query images has a plurality of sample images, the setting includes setting an i-th use condition for an i-th representative query image of the representative query images based on a similarity between the i-th representative query image and each of the sample images thereof with respect to an i-th feature that is set for the i-th representative query image, where i is a positive integer, the similarity based on which the i-th use condition is set is represented by a distance between the i-th representative query image and each of the sample images thereof, and the setting includes setting the i-th use condition based on a probability density distribution of the sample images of the i-th representative query image.

2. The computer-readable recording medium according to claim 1, wherein the setting includes changing the use condition depending on a precision of the image retrieval.

3. The computer-readable recording medium according to claim 1, wherein the calculating includes calculating an i-th similarity between the query image and an i-th representative query image of the representative query images with respect to an i-th feature that is set for the i-th representative query image, and the determining includes determining which one of the features to be used in the image retrieval based on whether the i-th similarity satisfies an i-th use condition that is set for the i-th representative query image.

4. The computer-readable recording medium according to claim 3, wherein the determining includes determining which one of the features is to be used in the image retrieval based on whether the i-th similarity is the highest among similarities calculated for the representative query images.

5. The computer-readable recording medium according to claim 3, wherein
the calculating includes calculating, as the i-th similarity, distance between the query image and the i-th representative query image.

6. The computer-readable recording medium according to claim 5, wherein
the determining includes determining which one of the features is to be used in the image retrieval based on whether the distance is the shortest among distances calculated for the representative query images.

7. An apparatus for image retrieval, comprising:
a setting unit configured to set a feature and a use condition for each of a plurality of representative query images;
a receiving unit configured to receive a query image;
an extracting unit configured to extract the feature and the use condition from each of the representative query images;
a calculating unit configured to calculate a similarity between the query image and each of the representative query images;
a determining unit configured to determine which one of features that are extracted from the representative query images by the extracting unit is to be used in the image retrieval based on whether the similarity satisfies the use condition extracted by the extracting unit;
a retrieving unit configured to retrieve at least one image from among a plurality of images by calculating a similarity between the query image and each of the images with respect to the feature that is determined to be used at the determining; and
an output unit configured to output the image retrieved by the retrieving unit,
wherein each of the representative query images has a plurality of sample images,
the setting includes setting an i-th use condition for an i-th representative query image of the representative query images based on a similarity between the i-th representative query image and each of the sample images thereof with respect to an i-th feature that is set for the i-th representative query image, where i is a positive integer,
the similarity based on which the i-th use condition is set is represented by a distance between the i-th representative query image and each of the sample images thereof, and
the setting includes setting the i-th use condition based on a probability density distribution of the sample images of the i-th representative query image.

8. A method that is implemented by an apparatus for image retrieval, comprising:
setting a feature and a use condition for each of a plurality of representative query images;
receiving a query image;
extracting the feature and the use condition from each of the representative query images;
calculating a similarity between the query image and each of the representative query images;
determining which one of features that are set for extracted from the representative query images at the extracting is to be used in the image retrieval based on whether the similarity satisfies the use condition extracted at the extracting;
retrieving at least one image from among a plurality of images by calculating a similarity between the query image and each of the images with respect to the feature that is determined to be used at the determining; and
outputting the image retrieved at the retrieving,
wherein each of the representative query images has a plurality of sample images,
the setting includes setting an i-th use condition for an i-th representative query image of the representative query images based on a similarity between the i-th representative query image and each of the sample images thereof with respect to an i-th feature that is set for the i-th representative query image, where i is a positive integer,
the similarity based on which the i-th use condition is set is represented by a distance between the i-th representative query image and each of the sample images thereof, and
the setting includes setting the i-th use condition based on a probability density distribution of the sample images of the i-th representative query image.

* * * * *